3,210,378
PRODUCTION OF PHTHALIC ANHYDRIDE BY CATALYTIC OXIDATION OF O-XYLENE
Helmut Nonnenmacher, Max Appl, and Konstantin Andrussow, all of Ludwigshafen (Rhine), Germany, assignors to Badische Anilin- & Soda-Fabrik Aktiengesellschaft, Ludwigshafen (Rhine), Germany
No Drawing. Filed Apr. 24, 1962, Ser. No. 189,702
Claims priority, application Germany, July 12, 1961, B 63,226
4 Claims. (Cl. 260—346.4)

This invention relates to the production of phthalic anhydride by catalytic oxidation of o-xylene in a fluidized bed.

A number of methods is known for the production of phthalic anhydride from naphthalene by catalytic oxidation in which the catalyst is maintained in fluidized condition. In published attempts to transfer this method to the oxidation of o-xylene, it has always been found that the satisfactory results obtained in the oxidation of naphthalene are not achieved in the oxidation of o-xylene. Either only a low conversion is achieved or a small yield of phthalic anhydride is obtained, whereas a considerable part of the o-xylene is burnt to carbon monoxide and carbon dioxide.

It is an object of this invention to provide a process by which o-xylene can be reacted to o-phthalic anhydride by the use of known catalysts or the catalysts described in the copending application Serial No. 189,701, filed by Helmut Nonnenmacher, Konstantin Andrussow, Max Appl, Anton Feinauer, Jürgen Haug, Alfred Helms, and Klaus Wiebusch, with better yields than by prior methods.

Another object of the invention is to provide a process by which it is possible to oxidize o-xylene to phthalic anhydride both with a high conversion and with high yields.

Another object of the invention is to provide a process in which catalysts which hitherto have been thought to be suitable only for oxidation of naphthalene can also be used for the oxidation of o-xylene.

These and other objects are achieved by passing o-xylene with oxygen or an inert gas containing oxygen and with a small amount of bromine or of a bromine compound which is gaseous or vaporous under the reaction conditions at a temperature of 250° to 380° C. in the vapor phase with a residence period of five to fifty seconds over a fluidized catalyst, said catalyst consisting at the reaction temperature of a fused liquid solution, distributed in the pores of a highly porous carrier, especially silica gel, said fused liquid solution being formed from vanadium pentoxide and, if desired, other additives in potassium pyrosulfate or a mixture of sodium pyrosulfate and potassium pyrosulfate.

The catalysts which may be used for the oxidation of o-xylene are described for example in Belgian patent specification No. 592,605 and in the copending application Serial No. 189,701, filed by Helmuth Nonnenmacher, Konstantin Andrussow, Max Appl, Anton Feinauer, Jürgen Haug, Alfred Helms, and Klaus Wiebusch. They may be prepared for example by applying a melt of the alkali pyrosulfate or pyrosulfates, in which vanadium pentoxide with or without other additives has been dissolved, to a large-surfaced carrier having a high pore volume. More specifically, the active substance is contained as a thin liquid solution in the pores of the catalyst support under the reaction conditions of o-xylene oxidation. The catalyst thus constitutes a two-phase system.

Aluminum phosphate, synthetic or natural silicates, silicic acid, especially in the form of silica gel, or active carbon may be used for example as large-surfaced carriers. Silica gel which has been obtained by precipitation of silica sol, subsequent drying, calcining and size reduction, is eminently suitable. It is used in a granular size of 10 to 3,000 microns, especially of 20 to 600 microns and advantageous 20 to 300 microns; the internal surface should be about 200 to about 400 square meters per gram, especially 300 to 360 square meters per gram and the mean pore radius should be about 50 to about 60 A. The large-surfaced carrier may also be used in the form of microballs which may be obtained by spray drying aqueous concentrates.

When active carbon of the granular size range of about 20 to about 600 microns is used, the temperature during the production of the catalyst and in the oxidation should as a rule not exceed 300° to 340° C. because otherwise combustion of the active carbon in the air stream will occur.

For the production of the molten liquid solution of pyrosulfate containing vanadium pentoxide and any other additives, potassium pyrosulfate or potassium hydrogen sulfate or a mixture of potassium and sodium pyrosulfates or hydrogen sulfates, with or without water, is heated and fused until the water has evaporated. Then at about 300° to about 450° C., the vanadium compounds, especially vanadium pentoxide or ammonium vanadate, and any other additives, are dissolved in the melt. It is preferred to use a mixture of sodium pyrosulphate and potassium pyrosulphate, especially a mixture having 10 to 50% by weight of sodium pyrosulphate.

In addition to the vanadium compounds specified, other vanadium compounds may be added which under oxidizing conditions are converted at the reaction temperature into vanadium pentoxide, for example vanadium trichloride, vanadium trioxide, vanadium tetroxide or vanadyl sulfate $VOSO_4$. The amount of vanadium compound used is such that the melt contains 5 to 30% by weight of vanadium pentoxide. It is preferred to use melts which contain 10 to 20% by weight of vanadium pentoxide.

It is advantageous also to dissolve in the said molten solution metal activators which accelerate the oxidation of hydrogen bromide to bromine, in an amount of up to 5% by weight with reference to the molten liquid solution. Such activators are compounds, especially oxidic compounds, of cerium, copper, iron, manganese, nickel and cobalt. Examples are ceric oxide, manganese dioxide, ferric oxide, cupric oxide, cobaltous oxide and nickelous oxide.

Phosphoric acid, molybdenum trioxide and/or tungsten trioxide may be used for example as further additives.

Phosphoric acid may be used as such or in the form of phosphorus pentoxide or in the form of compounds which yield phosphoric acid. Thus phosphorus pentasulfide, ammonium phosphate, sodium phosphate or potassium phosphate as primary, secondary or tertiary phosphates may be used. When using alkali phosphates, an amount of sulphuric acid equivalent to the alkali must be added and regarded as pyrosulfate. The phosphorus compounds are added in such an amount that a maximum of 4% by weight of phosphorus pentoxide is present in the molten liquid solution. The weight ratio of phosphorus pentoxide to vanadium pentoxide should not exceed 1:6. The phosphorus pentoxide has no appreciable effect if the weight ratio is below 1:200.

Any molybdenum compounds added may take the form for example of molybdic acid, molybdenum oxide, molybdenum sulfide or ammonium molybdate. It is however also possible to use sodium molybdate, potassium molybdate or advantageously phosphomolybdic acid. The content of alkali is preferably compensated for by adding sulfuric acid. Regard should be had to the alkali and/or phosphorus content of the added molybdenum compounds in the amount of pyrosulfate or phosphoric acid.

Instead of molybdenum compounds, tungsten compounds may be added, for example tungstic acid, tungsten oxides, tungsten sulfides, ammonium tungstate or phosphotungstic acid. Mixtures of molybdenum and tungsten compounds may also be added. The molybdenum and/or tungsten compounds are added in an amount such that the proportion thereof in the molten solution is up to 6% by weight of molybdenum trioxide (or an equivalent amount of tungsten trioxide) and the ratio of molybdenum trioxide or tungsten trioxide to vanadium pentoxide is 1:3. The effect of molybdenum and/or tungsten compounds is only noticeable at weight ratios above 1:20.

The catalysts may be further activated by a further addition, for example of 1 to 10% by weight of silver oxide with reference to vanadium pentoxide or up to 3% by weight with reference to the solution.

The total amount of vanadium pentoxide, the oxidation catalyst for hydrogen bromide which is advantageously added and any other additions of phosphoric acid, molybdenum and/or tungsten oxides and silver oxide used, in the pyrosulfate melt should not be more than 40% by weight (calculated as oxides) of the molten mixture or two-thirds of the pyrosulfate.

It is advantageous to prepare the pyrosulfate melt containing vanadium pentoxide and an addition of the said kind in the desired mixing proportions, allow the melt to solidify, reduce it in size and then apply it to the carrier.

Different methods may be used to apply the pyrosulfate melts containing vanadium pentoxide and any other additions to the carrier substance. For example the solidified fused material which has been ground to a grain size of about 200 microns or less may be mixed in a mixing drum with an appropriate amount of silica carrier and the whole then heated for several hours at temperatures above the melting temperature, for example at 300° to 450° C. The melt, which is liquefied in the process, is absorbed by the pores of the carrier material. It is advantageous to agitate the carrier to assist in uniform distribution of the melt. This may be effected for example in a heated agitated vessel or in a heated screw conveyor. Another method comprises allowing the powdered fused material to trickle into the carrier material, for example silica gel, which is fluidized by air or an inert gas, for example nitrogen or carbon dioxide, and allowing it to remain for a period, for example 8 hours, at a temperature above the melting temperature of the molten mixture. To homogenise the catalyst it may be kept in fluidized motion for some time in an air stream or in a stream of oxygen-containing gas at the reaction temperature for some time prior to use.

The said catalysts may however also be prepared by soaking silica gel with aqueous solutions of the above-mentioned components, and in this case alkali sulfates, if desired with the addition of sulfuric acid, may be used instead of alkali pyrosulfates. The impregnated catalyst is then dried and heated at temperatures of 200° to 600° C., especially at 250° to 450° C. When using alkali sulfates instead of alkali pyrosulfates it is necessary, in order to achieve the two-phase system in which a liquid melt is present in the pores of the catalyst support, to supply gas containing sulfur trioxide, or sulfur dioxide, or sulfur compounds which give sulfur dioxide at the catalyst, together with oxygen-containing gas during the heating, a temperature of about 250° to 500° C., especially 300° to 450° C., being maintained. By this treatment, the components present on the catalyst support in solid form are converted into a liquid alkali pyrosulfate melt in which vanadium and any other additives are dissolved.

The relative proportions of pyrosulfate melt, which contains vanadium pentoxide and any other additions, and carrier may be varied within a certain range. It is advantageous to use at least 10% by weight of the said molten solution with reference to the catalyst; the upper limit for the proportion of the molten solution in the catalyst depends largely on the nature of the carrier used. Too high a proportion leads as a rule to agglomeration and sticking together of the catalyst granules, for example a proportion of more than 60% by weight (with reference to the catalyst) when using silica gel as the carrier. It is therefore preferred to use 25 to 50% by weight of the molten mixture with reference to the catalyst, especially when using silica gel as carrier.

The maintenance of definite reaction temperatures is essential for the process according to this invention. The oxidation is conveniently carried out at 250° to 380° C., advantageously at 270° to 350° C. The reaction temperature must however be sufficiently high for the active constituents of the catalyst in the carrier to be in liquid form. The lower limit of temperature depends therefore on the melting temperature of the molten liquid solution present in the pores of the catalyst carrier used.

Flow velocity of the gases and vapors and the height of the fluidized bed should be correlated so that residence periods of five to fifty seconds, especially of eight to thirty seconds, are obtained. Residence period is defined as usual, i.e. it is the period during which the o-xylene is in contact with the catalyst, reference being had to the whole of the reaction chamber regarded as free from catalyst:

$$\text{Residence period} = \frac{\text{Catalyst chamber volume}}{\text{Gas volume per second (referred to the pressure and temperature in the catalyst chamber)}}$$

A further feature of the invention is the addition of bromine or a bromine compound which is gaseous or vaporous at the conditions prevailing at the catalyst. Examples of bromine compounds which may be used are inorganic compounds, such as hydrogen bromide, ammonium bromide, nitrosyl bromide and thionyl bromide, or organic compounds, such as alkyl bromides with 1 to 10 carbon atoms, cycloalkyl bromides with 1 to 12 carbon atoms, aryl bromides with 6 to 10 carbon atoms, aralkyl bromides with 7 to 10 carbon atoms, carboxylic acid bromides of fatty acids with 2 to 10 carbon atoms or of aryl monocarboxylic or dicarboxylic acids with 7 to 1 carbon atoms or of aralkyl-carboxylic acids with 8 to 10 carbon atoms. For example ethyl bromide, hexyl bromide, benzyl bromide and, especially advantageously, o-xylyl bromide, o-xylylene dibromide or o-xylylidene dibromide may be used. It is however also possible to use acetyl bromide, propionyl bromide and benzoyl bromide.

Bromine or a bromine compound is added in such an amount that in the catalyst chamber a weight ratio of bromine supplied to xylene supplied of 2:1000 to 1:100,000 is set up.

Under otherwise identical conditions, better yields of phthalic anhydride can be obtained by increasing the amount of bromine. For a given catalyst, a given temperature and a given residence period, however, there is a maximum amount of bromine above which further addition of bromine gives no appreciable increase in the yield of phthalic anhydride. It is however desirable to work with amounts of bromine which are not too high because working up the reaction product to pure phthalic anhydride is made more difficult with increasing bromine addition, and large amounts of bromine may furthermore lead to undesirable byproducts.

To achieve optimum results, catalyst, temperature, residence period and amount of bromine must be correlated.

If the catalyst contains in the pyrosulfate solution, not only vanadium pentoxide, but also compounds which accelerate conversion of hydrobromic acid to bromine, lower bromine concentrations may be used under otherwise the same conditions.

When using bromine or bromine compounds, the rule applies that the lower the reaction temperature the longer the residence period must be and the smaller the additions of bromine necessary to obtain optimum results.

For example at a reaction temperature of about 300° C. or less and residence periods of 20 to 50 seconds, bromine additions of 0.01 to 0.2% by weight of bromine, if desired in the form of compounds, has proved to be effective. In this temperature range, catalysts which contain the vanadium pentoxide and advantageously the additives promoting the oxidation of hydrogen bromide in a mixture of different alkali pyrosulfates, for example of sodium pyrosulfate and potassium pyrosulfate, with or without additions of phosphoric acid and/or molybdic acid and/or tungstic acid, are especially suitable.

In the temperature range of 310° to 340° C., however, residence periods of 8 to 30 seconds and additions of bromine or bromine compounds of 0.1 to 0.8% by weight of bromine with reference to o-xylene have proved effective. In this temperature range not only vanadium pentoxide-alkali pyrosulfate fused catalysts which contain more than one alkali pyrosulfate, but also those which contain only one alkali pyrosulfate, for example potassium pyrosulfate, may be used with advantage.

In the temperature range of about 340° to about 380° C., the favorable residence periods are between 5 and 15 seconds and the favorable bromine additions are about 0.4 to 2% by weight. It is advantageous to carry out the oxidation in the presence of small amounts of sulfur trioxide at the catalyst and therefore to supply sulfur trioxide or sulfur dioxide or sulfur compounds which are oxidized to sulfur trioxide under the reaction conditions at the catalyst, in small amounts to the catalyst chamber. Examples of sulfur compounds which may be used are thiophene, carbon disulfide and thionaphthene. The sulfur compounds are added in an amount of 1 to 500 g./kg. of catalyst per month, calculated as sulfur dioxide, or 1.2 to 620 g. calculated as sulfur trioxide. The supply may be effected continuously or intermittently. Reference to sulfur dioxide is simplest since it is the most convenient to use, although it is sulfur trioxide which is active at the catalyst itself.

The amount of sulfur dioxide or sulfur-containing compound should be correlated accurately to the reaction conditions, i.e. to the reaction temperature, the amount of bromine added and the residence period. The amount of sulfur dioxide or sulfur compounds to be used should be chosen the higher the reaction temperature is, the larger the amount of bromine used is and the shorter the residence period is.

It is advantageous to supply 1 to 50 g. of sulfur dioxide per kg. of catalyst per month in the form of sulfur dioxide or sulfur compounds when using a reaction temperature of about 300° C. or less, a residence period of 20 to 50 seconds and a bromine addition of 0.1 to 0.2% by weight of bromine.

In the temperature range of 310° to 340° C., residence periods of 8 to 30 seconds and bromine additions of 0.1 to 0.8% by weight with reference to o-xylene, amounts of sulphur dioxide of 30 to 200 g./kg. of catalyst per month, added as sulfur trioxide, sulfur dioxide or sulfur-containing compounds, have proved to be suitable. In the temperature range of about 340° to 380° C., residence periods of 5 to 15 seconds and bromine additions of 0.4 to 2% by weight it is advantageous to use about 50 to 500 g. of sulfur dioxide per kg. of catalyst per month in the form of sulfur trioxide, sulfur dioxide or sulfur compounds.

The supply of sulfur is advantageous for maintaining catalyst activity over long periods. If the amount of sulfur added is too small, the activity of the catalyst subsides when the other reaction conditions are maintained and it is necessary to raise the reaction temperature. If the sulfur content is too high, there is similarly a decline in catalyst activity.

The selectivity of the process, i.e. the ratio of phthalic anhydride to carbon dioxide and carbon monoxide in mole percent, becomes less with increasing temperature. On the other hand conversion of xylene decreases with decreasing temperature. Selectivity and conversion also depend on the catalyst.

When bromine or bromine compounds are present at the same time, there is an increase in conversion in all cases. It is therefore possible to achieve high conversion of o-xylene even at low temperatures and at the same time to utilize the high selectivity. Moreover the formation of byproducts, for example tolualdehyde, is decreased so that a further improvement in the selectivity is achieved in this way. Conversion, selectivity and yield for a catalyst of the composition: 8.16% of $V_2O_5$, 1.69% of $MoO_3$, 0.16% of $P_2O_5$, 0.10% of $Ag_2O$, 10.4% of $Na_2S_2O_7$, 30.5% of $K_2S_2O_7$ and 49.0% of $SiO_2$ at different temperatures, with and without addition of bromine (in the form of 1% of xylyl bromide with reference to xylene) at a residence period of twelve seconds are given in the following table:

| Temperature | Conversion of o-xylene in mole percent | Yield of phthalic anhydride in mole percent | Selectivity |
| --- | --- | --- | --- |
| 340° C.: | | | |
| Without bromine | 95.8 | 44.1 | 0.87 |
| With | 98.1 | 53.9 | 1.25 |
| 330° C.: | | | |
| Without bromine | 91.9 | 45.5 | 1.01 |
| With | 97.3 | 58.2 | 1.53 |
| 320° C.: | | | |
| Without bromine | 92.0 | 43.4 | 1.14 |
| With | 95.4 | 63.3 | 2.04 |

98 to 100% o-xylene may be used as initial material, but xylene mixtures may also be used which contain not only o-xylene but also up to 10% of m-xylene, p-xylene and/or ethylbenzene. Under the reaction conditions the last-mentioned compounds substantially burn to carbon dioxide or carbon monoxide. Oxygen is used as such or together with inert gases, for example with nitrogen or carbon dioxide. It is simplest to use air (containing 20% of oxygen). Gas mixtures containing less oxygen, for example 12 to 15% of oxygen, may however also be used. The o-xylene is introduced for example in an amount of 30 to 180 g. per m.³ (S.T.P.) of air, especially 75 to 150 g./m.³ (S.T.P.) of air, which corresponds to 150 to 900 g., especially 375 to 750 g. of xylene per m.³ (S.T.P.) of oxygen, into the fluidized bed of catalyst kept at the reaction temperature. The gas stream containing xylene is obtained for example by saturating a partial stream of gas and mixing it with the main stream, by evaporation into the gas stream or by injection, if desired by means of a stream of auxiliary gas, for example nitrogen. The mixture containing xylene may also be supplied separately from the oxygen-containing gas required for the reaction.

The initial concentration of xylene equivalent to the above values is from 0.6 to 3.8% by volume. By using a nozzle it is also possible to introduce the o-xylene in liquid form direct into the catalyst bed fluidized by oxidation gases.

The bromine or bromine-containing volatile compound may be premixed with the o-xylene and introduced into the reaction chamber in the manner described above for o-xylene. The supply of bromine may however also be effected by means of the oxygen-containing gas stream by metering the bromine or bromine-containing compound into the said gas stream by means of a saturator or vaporizer. The bromine or bromine-containing compound may also be introduced direct into the reaction chamber separately from the other gaseous or vaporous reactants by means of an inert gas stream, for example nitrogen or carbon dioxide.

The process may be carried out at normal pressure, slightly increased pressure, for example up to 3 atmospheres, or higher pressures, for example at 5 to 25 atmospheres.

The catalyst is kept in fluidized motion in a quartz tube in small plant and in a tube of iron or alloy steel, for example V2A-steel, in larger plant. Distribution of the gas is carried out at the lower end of the reaction tube, which may be conically constricted, through a plate of ceramic or metallic sintered material or through an annular gap produced by a conical insert. When using smaller reaction tubes, abstraction of heat may take place through the wall of the reaction tube, for example by air cooling or by means of a salt melt, while in larger systems the installation of cooling coils in the fluidized bed is necessary to abstract the reaction heat. The heat is then utilizable for steam production.

The catalyst undergoes only very slight attrition.

The following examples will further illustrate the invention without limiting it.

EXAMPLE 1

(a) *Production of the catalyst.*—3,390 g. of potassium pyrosulfate ($K_2S_2O_7$) and 1,466 g. of sodium hydrogen sulfate ($NaHSO_4.H_2O$) are fused in a crucible furnace and kept for about an hour at 350° C. The melt contains 25% of sodium pyrosulfate and 75% of potassium pyrosulfate. 907 g. of pure vanadium pentoxide is then introduced while stirring. Furthermore 210 g. of molybdic acid ($H_2MoO_4$), 33 g. of secondary ammonium phosphate and 11.1 g. of silver oxide are added to the melt. When all has been introduced, the mixture is heated for another hour at 370° C. After cooling and solidification, the fused material is ground to a grain size of less than 150 microns.

4,800 g. of this powdered fused material is mixed in a mixing drum with 4,610 g. of silica gel granulate, such as is known under the trade name of Silica Gel BS by BASF, having a granular size of 200 microns, and then heated in a vessel of V2A-steel, with constant mixing, to 350° C. within four hours and then kept at this temperature for another four hours. After the melt has been cooled, the finished catalyst is passed through a sieve having a width of mesh of 300 microns. The finished catalyst has the composition: 8.6% of $V_2O_2$, 1.69% of $MoO_3$, 0.16% of $P_2O_5$, 0.10% of $Ag_2O$, 10.4% of $Na_2S_2O_7$, 30.5% of $K_2S_2O_7$, 49.0% of $SiO_2$.

(b) *Oxidation of xylene.*—6 liters of the catalyst prepared under (a) is charged into a vertical reaction tube of V2A-steel 80 mm. in diameter and 2,000 mm. in length which is provided with electrical heating means. The height to which the tube is filled is 1,200 mm. The catalyst is heated to 320° C. 7 g. of a mixture of 69.3 g. of o-xylene and 0.7 g. of o-xylyl bromide ($CH_3$—$C_6H_4$—$CH_2Br$), equivalent to 0.43% of bromine with reference to o-xylene, is vaporized per hour into an air stream of 800 liters (S.T.P.). This xylene-laden air stream (87.5 g. of o-xylene per m.$^3$ (S.T.P.) of air) is passed through a preheater kept at 300° C. and then through a sintered plate of V2A-steel into the reaction tube where it fluidizes the catalyst. The temperature in the reaction chamber is controlled at 320° C. Entrained catalyst dust is entrained at the upper end of the reactor by means of a filter consisting of wire netting and quartz wool. A temperature of 200° to 250° C. is maintained in the filter zone, i.e. a temperature above the condensation temperature of phthalic anhydride. The gas mixture, which leaves the reaction tube after a residence period of 13 seconds at the catalyst, is cooled in an air-cooled separator having a length of 1,000 mm. and a diameter of 50 mm., the phthalic anhydride being deposited in crystalline form.

The gas, cooled to 40° C., is washed twice with water, the remainder of the phthalic anhydride and also maleic anhydride being absorbed. Carbon dioxide, carbon monoxide and xylene are determined analytically in the off-gas.

There are obtained per hour:

61.8 g. of phthalic anhydride, equivalent to 63.3 mole percent,
1.42 g. of maleic anhydride, equivalent to 1.1 mole percent,
36.7 liters (S.T.P.) of carbon dioxide and carbon monoxide, equivalent to 31.0 mole percent,
3.2 g. of residual xylene, equivalent to 4.6 mole percent.

The selectivity is accordingly 2.04.

Under otherwise the same conditions but at a reaction temperature of 330° C., there are obtained per hour:

56.8 g. of phthalic anhydride (58.2 mole percent),
1.49 g. of maleic anhydride (1.15 mole percent),
44.9 liters (S.T.P.) of carbon dioxide and carbon monoxide (38.0 mole percent),
1.85 g. of residual xylene (2.65 mole percent).

Selectivity 1.53.

At a reaction temperature of 340° C. but under otherwise identical conditions, there are obtained per hour:

52.7 g. of phthalic anhydride (53.9 mole percent),
1.42 g. of maleic anhydride (1.1 mole percent),
50.2 liters (S.T.P.) of carbon dioxide and carbon monoxide (43.1 mole percent),
1.3 g. of residual xylene (1.9 mole percent).

Selectivity 1.25.

If the addition of xylyl bromide is omitted, the following results are obtained per hour at the various reaction temperatures:

At 320° C.:

42.3 g. of phthalic anhydride (43.4 mole percent),
2.32 g. of maleic anhydride (1.8 mole percent),
45.2 liters (S.T.P.) of carbon dioxide and carbon monoxide (38.2 mole percent),
8 mole percent of residual xylene and 8.6 mole percent of o-tolualdehyde making a total of 16.6 mole percent.

Selectivity 1.14.

At 330° C.:

44.5 g. of phthalic anhydride (45.5 mole percent),
1.95 g. of maleic anhydride (1.5 mole percent),
53.2 liters (S.T.P.) of carbon dioxide and carbon monoxide (44.9 mole percent),
5.7 g. of residual xylene (8.1 mole percent) (and small amounts of o-tolualdehyde).

Selectivity 1.01.

At 340° C.:

43.2 g. of phthalic anhydride (44.1 mole percent),
1.56 g. of maleic anhydride (1.2 mole percent),
59.8 liters (S.T.P.) of carbon dioxide and carbon monoxide (50.5 mole percent),
2.9 g. of residual xylene (4.2 mole percent).

Selectivity 0.87.

EXAMPLE 2

7 liters of a catalyst which has been prepared from appropriate amounts of the specified initial materials in the way described in Example 1 and which has the following composition: 8.2% of $V_2O_5$, 1.3% of $Ag_2O$, 7.9% of $Na_2S_2O_7$, 27.6% of $K_2S_2O_7$ and 55% of Silica Gel BS (of BASF), is used in the same way as in Example 1, but 400 liters (S.T.P.) of air and 35 g. of o-xylene with 0.088 g. of o-xylyl bromide (equivalent to 0.11% of bromine with reference to o-xylene) are supplied. The residence period at the catalyst is about 33 seconds. At a reaction temperature of 310° C. there are obtained per hour:

29.4 g. of phthalic anhydride (60.2 mole percent),
0.78 g. of maleic anhydride (1.2 mole percent),
20.7 liters (S.T.P.) of carbon dioxide and carbon monoxide (35.0 mole percent),
1.19 g. of residual xylene (3.4 mole percent).

Selectivity 1.72.

If the addition of xylyl bromide is omitted, there are obtained per hour at the same temperature:

22.8 g. of phthalic anhydride (46.7 mole percent),
1.17 g. of maleic anhydride (1.8 mole percent),
25.1 liters (S.T.P.) of carbon dioxide and carbon monoxide (42.5 mole percent),
3.15 g. of residual xylene (9 mole percent) (small amounts of tolualdehyde are contained in the residual xylene).

Selectivity 1.1.

EXAMPLE 3

A 0.7% solution of nitrosyl bromide in o-xylene is prepared (equivalent to 0.5% of bromide with reference to o-xylene). This solution is vaporized in an evaporator in the conventional way in a stream of air of 400 liters (S.T.P.) per hour and passed into the reaction chamber as described in Example 1, 35 g. of o-xylene per hour being thus metered in. The reaction chamber contains 7 liters of a catalyst consisting of 7.55% of $V_2O_5$, 1.60% of $MoO_3$, 0.15% of $P_2O_5$, 0.10% of $Ag_2O$, 35.6% of $K_2S_2O_7$ and 55% of silica gel and prepared as described in Example 1 from appropriate amounts of the said initial materials. The temperature in the fluidized bed is kept at 310° C. The residence period at the catalyst is 33 seconds.

There are obtained per hour:

29.0 g. of phthalic anhydride (59.3 mole percent),
0.78 g. of maleic anhydride (1.2 mole percent),
21.4 liters (S.T.P.) of carbon dioxide and carbon monoxide (36.3 mole percent),
1.12 g. of residual xylene (3.2 mole percent).

Selectivity 1.63.

By using hydrogen bromide instead of nitrosyl bromide, by vaporizing a 0.5% solution of hydrogen bromide in o-xylene as the initial material, the following results are obtained with an hourly throughput of 35 g. of o-xylene at 310° C.:

29.3 g. of phthalic anhydride (60.1 mole percent),
0.81 g. of maleic anhydride (1.25 mole percent),
21.3 liters (S.T.P.) of carbon dioxide and carbon monoxide (36.0 mole percent),
0.93 g. of residual xylene (2.65 mole percent).

Selectivity 1.67.

When using, instead of hydrogen bromide or nitrosyl bromide, the substances specified in the table below, the results are as follows:

| Additive | Weight percent supplied with reference to xylene | Weight percent of chromium supplied with reference to xylene | Phthalic anhydride (mole percent) | Selectivity |
|---|---|---|---|---|
| 4-bromoxylene | 1.16 | 0.5 | 57.6 | 1.57 |
| Ethyl bromide | 0.68 | 0.5 | 60.5 | 1.66 |
| Cyclohexyl bromide | 1.02 | 0.5 | 59.1 | 1.61 |
| Acetyl bromide | 0.77 | 0.5 | 60.3 | 1.69 |
| Benzoic acid bromide | 1.16 | 0.5 | 58.9 | 1.60 |
| Phenylacetic acid bromide | 1.25 | 0.5 | 59.2 | 1.58 |

If hydrogen bromide or nitrosyl bromide is omitted, there are obtained per hour:

20.1 g. of phthalic anhydride (41.2 mole percent),
1.49 g. of maleic anhydride (2.3 mole percent),
24.2 liters (S.T.P.) of carbon monoxide and carbon dioxide (41.0 mole percent),
3.3 g. of residual xylene (about 9.5 mole percent) and o-tolualdehyde (about 6 mole percent) making a total of 15.5 mole percent.

Selectivity 1.0.

EXAMPLE 4

By using a catalyst consisting of 3.9% of vanadium pentoxide, 29.6% of potassium, pyrosulfate and 66.5% of $SiO_2$ which has been prepared analogously to Example 1 from appropriate amounts of the initial materials there specified, and supplying 35 g. of o-xylene containing 1% of xylyl bromide, and 400 liters (S.T.P.) per hour of air to 7 liters of catalyst in a fluidized bed as in Example 1 at a residence period of 32 seconds and a reaction temperature of 340° C., 57.5 mole percent of phthalic anhydride is obtained at a conversion of 99% (selectivity 1.35).

If the addition of bromide be dispensed with, the yield falls to 38.5 mole percent of phthalic anhydride, the conversion to 96% and the selectivity to 0.66.

EXAMPLE 5

10.5 liters of a catalyst consisting of 7.58% of $V_2O_5$, 0.15% of $P_2O_5$, 1.57% of $MoO_3$, 0.10% of $Ag_2O$, 8.0% of $Na_2S_2O_7$, 27.6% of $K_2S_2O_7$ and 55% of $SiO_2$ which has been prepared in the way described in Example 1 is placed in a reaction vessel of V2A-steel having a diameter of 80 mm. and a length of 3,000 mm.

(A) At a residence period of about 48 seconds, a throughput of 35 g. of o-xylene per hour and 400 liters (S.T.P.) of air per hour (87.5 g. of o-xylene per m.$^3$ (S.T.P.) of air) and in the presence of 0.46% of o-xylyl bromide, equivalent to 0.2% of bromine with reference to o-xylene, and at a reaction temperature of 290° C. there are obtained:

33.2 g. of phthalic anhydride (68.0 mole percent),
1.42 g. of maleic anhydride (2.2 mole percent),
15.4 liters (S.T.P.) of carbon dioxide and carbon monoxide (26.1 mole percent),
1.3 g. of residual xylene (3.7 mole percent).

Selectivity 2.61.

With otherwise the same conditions but in the presence of 0.4% of bromine with reference to o-xylene, added as xylyl bromide, there are obtained:

33.3 g. of phthalic anhydride (68.3 mole percent),
1.3 g. of maleic anhydride (2.0 mole percent),
16.2 liters (S.T.P.) of carbon dioxide and carbon monoxide (27.5 mole percent),
0.77 g. of residual xylene (2.2 mole percent).

Selectivity 2.49.

Without the addition of bromide and under the above reaction conditions, only 46.5 mole percent of phthalic anhydride, 1.6 mole percent of maleic anhydride, 29.4 mole percent of carbon dioxide and carbon monoxide, 15 mole percent of o-tolualdehyde and 7.5 mole percent of residual xylene.

(B) If however the reaction is carried out at 310° C. and 52.7 g. of o-xylene per hour and 600 liters (S.T.P.) of air per hour are added, a residence period of 34 seconds being achieved, the following are obtained per hour in the presence of o-xylyl bromide in an amount equivalent to 0.2% of bromine with reference to o-xylene:

44.9 g. of phthalic anhydride (61.1 mole percent),
0.98 g. of maleic anhydride (1.0 mole percent),
32.5 liters (S.T.P.) of carbon dioxide and carbon monoxide (36.6 mole percent),
0.68 g. of residual xylene (1.3 mole percent).

Selectivity 1.67.

Under the same conditions but with 1% of o-xylyl bromide (0.43% of bromine with reference to o-xylene) there are obtained on the contrary:

48.4 g. of phthalic anhydride (65.9 mole percent),
0.88 g. of maleic anhydride (0.9 mol percent),
28.6 liters (S.T.P.) of carbon dioxide and carbon monoxide (32.2 mole percent),
0.53 g. of residual xylene (1.0 mole percent).

Selectivity 2.05.

Without the addition of bromine and under otherwise identical conditions there are obtained:

39.9 g. of phthalic anhydride (54.3 mole percent),
1.17 g. of maleic anhydride (1.2 mole percent),
37.6 liters (S.T.P.) of carbon dioxide and carbon monoxide (42.2 mole percent),
1.1 g. of residual xylene (2.1 mole percent).

Selectivity 1.29.

EXAMPLE 6

If the process according to Example 1 is carried out under the conditions described therein with 0.4% by weight of bromine with reference to o-xylene and at a reaction temperature of 320° C., there is observed after prolonged operation a fall in yield from 63.3 mole percent (after 1,000 hours) to 56.8 mole percent (after 1,200 hours). By adding 0.5% by weight of sulfur dioxide with reference to o-xylene the yield is restored to its original value in the course of the next 200 hours and provided the supply of sulfur dioxide is continued the yield remains constant. By this measure, the yield no longer declines even with very prolonged operational periods. The amount of sulfur dioxide supplied is equivalent to 42 g. of sulfur dioxide per liter of catalyst per month or 60 g. of sulfur dioxide per kg. of catalyst per month. These results are tabulated below:

*Table*

| Duration of experiment in hours | 1,000 | 1,200 | 1,400 | 3,000 |
| --- | --- | --- | --- | --- |
| Percent of SO₂ supplied with reference to o-xylene | 0 | 0 | 0.5 | 0.5 |
| Phthalic anhydride, mole percent | 63.3 | 56.8 | 63.2 | 63.3 |
| Maleic anhydride, mole percent | 1.1 | 1.0 | 1.1 | 1.1 |
| CO₂+CO, mole percent | 31.0 | 29.7 | 30.7 | 30.9 |
| Residual xylene (plus tolualdehyde) | 4.6 | 12.5 | 5.0 | 4.7 |
| Selectivity | 2.04 | 1.91 | 2.06 | 2.05 |

What we claim is:

1. A process for the vapor-phase catalytic oxidation of o-xylene to phthalic anhydride which comprises bringing a gas selected from the group consisting of oxygen and gases containing molecular oxygen which are inert under the conditions of the reaction, said gas containing 150 to 900 g. o-xylene per cubic meter S.T.P. oxygen and further containing $10^{-3}\%$ to 2% by weight with reference to o-xylene of a member selected from the group consisting of bromine and bromine containing compounds being gaseous at the reaction temperature into contact with a catalyst maintained in a fluidized condition in the approximate temperature range of 250 to 380° C. for a residence period of from 5 to 50 seconds, said catalyst being a solution applied to a porous inert carrier of 5 to 30% by weight of vanadium pentoxide with reference to the solution in a salt of pyrosulfuric acid selected from the group consisting of potassium pyrosulfate and mixtures of potassium pyrosulfate and sodium pyrosulfate in a ratio by weight of up to 1:1.

2. A process for the vapor-phase catalytic oxidation of o-xylene to phthalic anhydride which comprises bringing a gas selected from the group consisting of oxygen and gases containing molecular oxygen which are inert under the conditions of the reaction, said gas containing 150 to 900 g. o-xylene per cubic meter S.T.P. oxygen and further containing $10^{-3}\%$ to 2% by weight with reference to o-xylene of a member selected from the group consisting of bromine and bromine containing compounds being gaseous at the reaction temperature into contact with a catalyst maintained in a fluidized condition in the approximate temperature range of 250 to 380° C. for a residence period of from 8 to 30 seconds, said catalyst being a solution applied to a porous inert carrier of 5 to 30% by weight of vanadium pentoxide with reference to the solution in a salt of pyrosulfuric acid selected from the group consisting of potassium pyrosulfate and mixtures of potassium pyrosulfate and sodium pyrosulfate in a ratio by weight of up to 1:1, said solution further containing at least one member selected from the group consisting of phosphorous pentoxide, molybdenum trioxide, tungsten trioxide, silver oxide, iron oxides, nickel oxides, cobalt oxides, cerium oxide, copper oxides and manganese oxides with the provisions that the amount of phosphorous oxide does not exceed 4% by weight with reference to the solution and one-sixth that of vanadium pentoxide, the amount of molybdenum trioxide does not exceed 6% by weight of the solution, the amount of tungsten trioxide does not exceed 6% by weight of the solution and the total of molybdenum and tungsten trioxide does not exceed one-third of the weight of vanadium pentoxide, the amount of silver oxide does not exceed 3% by weight with reference to the solution and one-tenth that of vanadium pentoxide and the amounts of iron oxide, nickel oxide, cobalt oxide, cerium oxide, copper oxide and manganese oxide do not exceed 5% by weight with reference to the solution, and further the total of vanadium pentoxide, phosphorous pentoxide, molybdenum trioxide, tungsten trioxide, silver oxide, nickel oxide, iron oxide, cobalt oxide, cerium oxide, copper oxide and manganese oxide does not exceed two-thirds of the weight of the alkali pyrosulfate.

3. A process as in claim 1 wherein sulfur trioxide is passed over said catalyst along with o-xylene, the gas selected from the group consisting of oxygen and gases containing molecular oxygen, and a member of the group consisting of bromine and bromine compounds, said bromine and bromine compounds being gaseous at the reaction temperature, the amount of said sulfur trioxide introduced being from 1 to 625 g. per kg. catalyst per month.

4. A process as in claim 2 wherein sulfur trioxide is passed over said catalyst along with o-xylene, the gas selected from the group consisting of oxygen and gases containing molecular oxygen, and a member of the group consisting of bromine and bromine compounds, said bromine and bromine compounds being gaseous at the reaction temperature, the amount of said sulfur trioxide introduced being from 1 to 625 g. per kg. catalyst per month.

References Cited by the Examiner

UNITED STATES PATENTS

| 2,270,779 | 1/42 | Berl | 260—346.4 |
| 2,471,853 | 5/49 | Beach et al. | 260—346.4 |
| 2,574,511 | 11/51 | Toland | 260—346.4 |
| 2,954,385 | 9/60 | Burney et al. | 260—346.4 |
| 2,973,371 | 2/61 | Chomitz et al. | 260—346.4 |
| 2,989,544 | 6/61 | Saunders et al. | 260—346.4 |

OTHER REFERENCES

Sherwood, Petroleum Refiner, vol. 32, No. 3 (1953), pages 113–17.

NICHOLAS S. RIZZO, *Primary Examiner.*

D. McCUTCHEN, I. MARCUS, *Examiners.*